United States Patent Office
3,073,788
Patented Jan. 15, 1963

3,073,788
POLYURETHANE FOAMS
Fritz Hostettler and Robert K. Barnes, Charleston, and Robert W. McLaughlin, Belle, W. Va., assignors to Union Carbide Corporation, a corporation of New York
No Drawing. Filed Nov. 17, 1959, Ser. No. 853,441
9 Claims. (Cl. 260—2.5)

This invention relates to foamed polymers derived from isocyanate-modified alkylene oxide addition products of glycosides and to their method of preparation.

It has been proposed heretofore to prepare foamed polymers by forming a polyester of a triol and a dicarboxylic acid, e.g., glycerol or trimethylol propane with adipic acid, and reacting the terminal active hydrogens of the polyester with a diisocyanate. The isocyanate-modified polyester is simultaneously or stepwise foamed by internal development of carbon dioxide and cross linking of the modified polyesters, or by means of a blowing agent which vaporizes at or below the temperature of the foaming mass. Foams of this type have given promise of finding wide utility in the field of insulation and structural reinforcement. They also have given promise of being more versatile in that they can be foamed in place and thereby effect an obvious savings in labor and handling.

The discovery has now been made that foamed polymers of widely varying and preselected properties can readily be prepared from isocyanate-modified alkylene oxide addition products of glycosides. The foamed polymers of the invention can be rigid or flexible, open-celled or closed-celled and the flexible foams may be resilient or flaccid. The foamed products of the invention have the advantage of being capable of preparation without the application of external heat and of having high and low density by suitable modification, good resistance to solvents and little tendency to support combustion. Another advantage that is most desirable from a commercial point of view is that the difficulties heretofore experienced in removing water of condensation from the polyesters and of keeping water out of the reaction until the proper time is very much reduced in that the alkylene oxide addition products utilized herein are formed without formation of water of condensation.

As used herein throughout the specification and claims, the term "isocyanate" refers to organic polyisocyanates. The term "residue," in reference to organic polyisocyanates, refers to the organic portion of an isocyanate compound exclusive of the reactive isocyanato groups. The term "isocyanate-modified . . . addition products" refers to an alkylene oxide glycoside reaction product in which the hydroxyl groups thereof are connected to organic polyisocyanate residues by means of a urethane linkage. The term "polyalkyleneoxy" as employed herein refers to at least one or more alkylene groups separated by a divalent oxy group.

In accordance with the invention urethane foams are prepared by forming a foamant polymer having reactive hydroxyl groups which comprise an alkylene oxide addition product of a glycoside, extending the polymer, building up the network polymer and developing the foam reaction. The network formation and building up of the foam can take place substantially simultaneously, as in the so called "one shot method," or in more or less distinct steps as in the semiprepolymer technique. For most economical operation and directness of procedure as well as continuous operation, it is preferred to prepare the foamant, i.e., the alkylene oxide-glycoside addition product, in a first stage and then effect substantially simultaneous network and foam development in a second stage by admixing the foamant, polyisocyanate and water in the presence of a catalyst, or by partially extending the foamant with excess isocyanate and then adding additional foamant and water in a subsequent stage. The various stages can be extended to the point of becoming distinct or accelerated to the extent of making the successive stages almost simultaneous.

The foamant polymer or alkylene oxide addition product of the first stage is prepared by reacting an alkylene oxide with a glycoside compound in the presence of an alkaline catalyst. The resulting reaction products, identified as hydroxypolyalkyleneoxy glycosides, are characterized by the presence in their molecular structure of hydroxyl-terminated chains of alkylene links, substituted or unsubstituted, which are connected to one another by means of recurring divalent oxy groups. The addition products may be exemplified in simplification by reference to the following general formula:

(I) 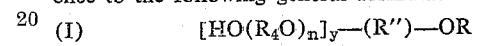

in which R is a monovalent radical selected from the group of alkyl and aralkyl radicals; $R_4$ is a member of the class of ethylene radicals, propylene radicals and mixtures thereof; $y$ is an integer of 3 to 4; $n$ is a number having a value of at least one; and (R") represents the organic portion exclusive of reactive hydroxyl groups of a glycoside derived from a simple sugar.

The term "glycoside" as used herein refers to a non-reducing monosaccharide in which an alkyl or aralkyl radical is attached to a carbonyl carbon atom through an oxygen atom. The term "non-reducing monosaccharide" denotes a simple sugar which does not reduce Fehling's solution.

The starting materials which are condensed with alkylene oxides are glycosides in which the non-sugar or aglycone, as characterized by R in the foregoing equation, is an aralkyl group, as for example, benzyl, or an alkyl group of one to eight carbon atoms, such as methyl, ethyl, propyl, isopropyl, n-butyl, isobutyl, tertiary amyl, hexyl and 2-ethylhexyl. The sugar constituent of the glycoside, corresponding to R" in the formula, is derived from a pentose, such as xylose, lyxose, arabinose or ribose; a hexose, such as glucose, mannose, altrose, talose, galactose, idose, gluose, fructose, allose, psicose, sorbose and tagatose; or a desoxy derivative formed by the replacement of a hydroxyl substituent in the sugar with hydrogen such as the desoxyhexoses, rhamnose and fructose. The sugar constituent can be in the furanoside or pyranoside form of acetal structure.

Among the glycosides which can be employed are the alpha and beta forms of methyl-D-arabinoside, methyl-D-xyloside, ethyl-D-xyloside, n-butyl-D-riboside, methyl, ethyl, propyl, butyl and 2-ethylhexyl-D-glycoside, 2-ethylhexyl-D-fructoside, isobutyl-D-mannoside, ethyl-D-galactoside, benzyl-D-glucoside and methyl-L-rhammoside. The preferred glycosides are the alkyl glycosides, and preferably the lower alkyl glycosides in which the alkyl group contains one to six carbon atoms.

The above-described glycosides which are used in the practice of the invention constitute a known class of materials. In general the synthesis of glycosides may be accomplished by the Fischer method which involves reaction between simple sugars and the appropriate alcohol in the presence of an acid catalyst, or by methods based on the replacement of the halogen atom of tetraacetyl-glycosyl halides followed by saponification of the acetal groups. See Fieser and Fieser, Organic Chemistry, D. C. Heath & Co., Boston (1956), p. 378.

The glycosides which are employed may be a single compound of definite composition or a mixture of isomers together with a small amount of residue products as obtained in the preparation of such compounds.

The foamant polymers are obtained by reacting the glycoside compounds above described with a 1,2-alkylene oxide selected from the group of ethylene oxide and propylene oxide, or mixtures thereof. The reaction is conducted in the presence of a small amount of catalyst by adding the alkylene oxide to the glycoside material which is preferably stirred and in a molten state. If desired, the glycoside can be slurried in an inert solvent, e.g., toluene, xylene or other suitable hydrocarbon solvents and then reacted with alkylene oxide. The reaction is carried out in the absence of water under atmospheric or superatmospheric pressure at temperatures of about 110 to 170° C. To the extent required any conventional heat transfer means can be used to remove the exothermic heat of reaction. The products of the reaction are generally mixtures which may be utilized as such or further refined to provide a discrete compound.

The amount of alkylene oxide to be reacted with the glycoside is chosen with a view toward the characteristics desired in the foamant and foamed product. As a general rule urethane foams of maximum rigidity are prepared by the use of foamants within a molecular weight range of about 450 to 1250; for semirigid foams the molecular weight of the foamant should be about 800 to 1800; and for flexible open-cell foams the foamant should be of increased chain length and have a molecular weight of about 1800 to 6000. To obtain such products having the desired molecular weights the glycoside starting materials are treated with the 1,2-alkylene oxide until each adduct represented in Formula I above by $-(OR_4)_nOH$ contains at least one mole of alkylene oxide. Within these limits, of course, the addition of alkylene oxide to each hydroxyl can be balanced or unbalanced, i.e., each may contain approximately the same or different average number of alkylene oxide groups per chain. For high molecular weight products the total moles of alkylene oxide reacted with each hydroxyl group can range from one to about 40 moles, or more.

In carrying out the alkylene oxide reaction any of the known catalysts for this type of addition reaction can be employed. The preferred catalysts are alkaline catalysts, e.g., alkali metal catalysts such as sodium hydroxide and potassium butoxide. The amount of catalyst employed is preferably in the range of 0.002 to 2.0 percent by weight, based on the total amount of reactants, including the alkylene oxide or mixtures thereof appearing in the reaction product. An amount of active catalyst within this range is not so large as to cause excessive decomposition of the alkylene oxide addition product of the main reaction, and good results have been obtained with about 0.01 to 0.5 percent by weight, based on the total reactants, of sodium hydroxide or potassium t-butoxide. By active catalyst is meant the amount of catalyst present which has an alkalinity on the order of the alkali metal hydroxides. In general, the stronger the alkalinity of the catalyst, the less of it is required. All of the catalyst need not be added at the start of the reaction. If desired, a suitable amount may be initially added and the remainder of the catalyst added from time to time throughout the course of the reaction to maintain a substantially constant catalyst concentration.

The average molecular weight and reactivity of the hydroxypolyalkyleneoxy glycosides can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-glycoside reaction product and is determined by reacting acetic anhydride (in pyridine solution) at refluxing temperature with the hydroxyl groups of the reaction product. The unreacted anhydride and acetic acid formed are titrated with aqueous sodium hydroxide using phenolphthalein as an indicator. The molecular weight can be readily calculated from the hydroxyl number by the formula:

$$(II) \quad M.W. = \frac{\text{Functionality} \times 1000 \times 56.1}{\text{Hydroxyl No.}}$$

It is to be understood that the alkylene oxide addition products include not only the products prepared by reaction of a single alkylene oxide but also those involving the reaction of two different alkylene oxides. It is also to be understood that the term "foamant," "foamant polymer" and "alkylene oxide glycoside addition product" are used interchangeably to identify the hydroxypolyalkyleneoxy ethers of glycosides as illustrated in Formula I, supra.

The foaming operation can be carried out in a continuous or batchwise fashion. The one-shot method, involving substantially simultaneous isocyanate extension of the foamant, cross linking and foam formation, is the most direct and economical. The semiprepolymer technique, involving partial extension of the foamant with excess isocyanate followed by foaming and network development at a later stage, is desirable when the final processing is to be kept to a minimum. It is also desirable, in the case of flexible foams, to form a prepolymer by prereacting molar equivalents of the foamant and isocyanate in the absence of water and thereafter producing a foam by the addition of excess isocyanate, a catalyst, water and a surfactant.

The amount of polyisocyanate reacted with the foamant polymer in preparation of a flexible, rigid or semirigid foam should be in excess of the equivalent amount required for reaction with each hydroxyl group of the foamant. The amount employed will be sufficient to have present in the total mass at least more than one equivalent of polyisocyanate, regardless of how combined, per equivalent of the foamant polymer. In other words, the amount of isocyanate compound employed must be such that there is more than the theoretical amount required to form a urethane linkage by reaction of hydroxyl and isocyanato groups. In accordance therewith, the amount of polyisocyanate employed is from about 1.05 to 7, preferably 2 to 6, equivalents per equivalent of foamant polymer.

The reaction of a foamant polymer containing three hydroxyl groups with excess isocyanate, such as a diisocyanate, can be illustrated by the formula:

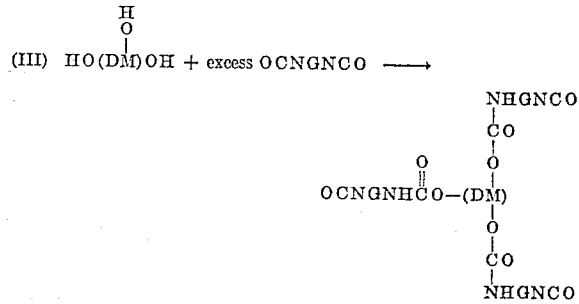

in which DM stands for the alkylene oxide-glycoside addition product of the first stage exclusive of the hydroxyl groups and G stands for an aliphatic, cycloaliphatic or aromatic diisocyanate, exclusive of the reactive isocyanato groups, such as m- and p-phenylene diisocyanates; 2,4- and 2,6-toluene diisocyanates; 2,3,5,6-tetramethyl-para-phenylene diisocyanate; o-, m-, and p-xylene diisocyanates; 4,4'-biphenylene diisocyanate; 3,3'-dimethyl-4,4'-biphenylene diisocyanate; 3,3'-dimethoxy-4,4'-biphenylene diisocyanate; p,p'-bibenzyl diisocyanate; p,p'-diphenylmethane diisocyanate; 4,4'-methylene-bis-ortho-tolyl diisocyanate; 1,5-naphthalene diisocyanate;

tetramethylene diisocyanate; hexamethylene diisocyanate; and various other diisocyanates such as those listed in the table of Siefken (Annalen 562, pages 122–135) (1949).

Branched isocyanate-modified polymers are also obtainable, in accordance with the invention, by reacting the foamant polymer with an isocyanate having more than two reactive isocyanato groups.

The reaction of the foamant polymer with the polyisocyanate, which is exothermic, can be accomplished at temperatures varying from room temperature, i.e., about 24° C., up to temperatures of about 200° C. The upper limit of reaction temperature is based on the thermal stability of the foamant-isocyanate reaction product whereas the lower limit is determined by the lowest economical rate of reaction. Generally at temperatures below about 75° C. the reaction is too slow to be feasible unless a catalyst is employed. At temperatures higher than about 300° C. there is danger of destructive decomposition of the reactants and reaction products. If the isocyanate-modified foamant is a prepolymer and is to be stored before use, it is preferable to carry out the reaction with isocyanate in the absence of a catalyst and at temperatures within the range of about 80 to 120° C. The time of reaction will vary of course depending upon temperature as well as upon the absence of a catalyst or retarder and the identity thereof.

It is often desirable in the preparation of a prepolymer to add a retarder during or after the isocyanate reaction especially if the isocyanate-modified foamant is intended to be stored. This not only slows down, as the name implies, the rate of reaction between hydroxyl and isocyanato groups, but also inhibits reaction between the urethane groups formed and the isocyanato groups. Among the suitable retarders are acids such as hydrochloric acid, sulfuric acid, phosphoric acid, boric acid, various organic acids, organic acid halides such as acetyl chloride and acetyl bromide, sulfonyl halides such as paratoluene sulfonyl chloride, inorganic acid halides such as phosphorous tribromide, phosphorus trichloride, phosphorus oxy chloride, sulfonyl chloride and thionyl chloride, as well as sulfur dioxide and acidic sulfones.

When it is desired to form a foam, a mixture of the isocyanate-modified foamant and excess unreacted isocyanate is mixed with water, preferably in the presence of a catalyst. This involves several reactions that proceed simultaneously. One illustrated schematically in the equation:

(IV) 2 . . . GNCO+H$_2$O→
 . . . GNHCONHG . . . +CO$_2$ involves the reaction between the isocyanato groups and water to form urylene links and carbon dioxide. This reaction has the important effect of producing carbon dioxide in situ for forming the voids of the final foamed product and also of linking the terminal isocyanato groups and thereby extending the isocyanate-modified foamant. Another of the reactions involves reaction of the urylene links so formed with unreacted isocyanato groups to form biuret cross links as illustrated by the equation:

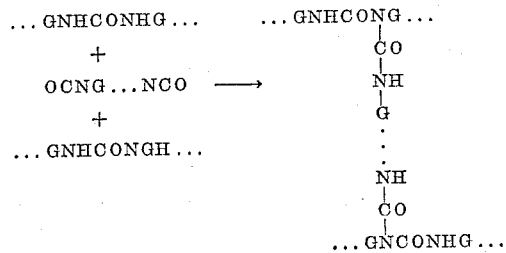

Depending upon the desired density of the foam and the amount of cross linking desired, the amount of water added should be such that the ratio of equivalents of water to residual isocyanate equivalents, i.e., the isocyanate which is present as excess isocyanate over the reactive groups of the foamant polymer, is preferably kept within the range of from 0.5:1.0 to 1.5:1.0 and most preferably within a range of about 0.8:1 to 1.2:1.

The foaming operation can also be effected by means of a blowing agent, such as a low boiling, high molecular weight gas, which vaporizes at or below the temperature of the foaming mass. In rigid foams intended for use in the field of insulation and structural reinforcement the incorporation of a gas lowers its heat conductivity. Hence if a fluorocarbon gas such as trichloromonofluoromethane, "Ucon 11," is used in blowing rigid foams, a lower K-factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures.

Preferred blowing agents are the fluorocarbons such as trichloromonofluoromethane; dichlorodifluoromethane, dichlorofluoromethane, 1,1-dichloro-1-fluoroethane; 1-chloro-1,1-difluoro-2,2-dichloroethane; and 1,1,1-trifluoro-2-chloro-2-fluoro - 3,3 - difluoro-4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

Catalysts that are suitable for the foaming and cross linking or curing reaction include inorganic and organic bases such as sodium hydroxide, sodium methylate, sodium phenolate, tertiary amines and phosphines. Particularly suitable amine catalysts include 2,2,1-diazabicyclooctane, trimethylamine, 1,2-dimethylimidazole, triethylamine, diethyl cyclohexylamine, dimethyl long-chain $C_{12}$ to $C_{18}$ amines, dimethylaminoethanol diethylaminoethanol, N-methyl morpholine, N-ethyl morpholine, triethanolamine and the like. Other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, and mercury salts.

Organic tin compounds characterized by at least one direct carbon to tin valence bond are also suitable as catalysts for the foaming reaction. Among the many types of tin compounds having carbon to tin bonds, of which specific representative compounds have been tested and shown to be active, are tin compounds having the general formulae set forth below:

(a)  R$_3$SnX
(b)  R$_2$SnX$_2$
(c)  RSnX$_3$
(d)  R$_2$SnY
(e)  RSnOOR'
(f)  R(SnOOR')$_2$
(g)  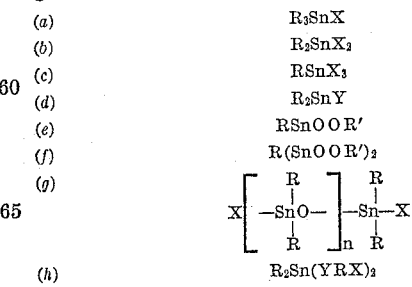
(h)  R$_2$Sn(YRX)$_2$ in which R's represent hydrocarbon or substituted hydrocarbon radicals such as alkyl, aralkyl, aryl, alkaryl, alkoxy, cycloalkyl, alkenyl, cycloalkenyl, and analogous substituted hydrocarbon radicals; the R's represent hydrocarbon or substituted hydrocarbon radicals such as those designated by the R's or hydrogen or metal ions; the X's represent hydrogen, halogen, hydroxyl, amino, alkoxy, substituted alkoxy, acyloxy, substituted acyloxy, acyl radicals or organic residues connected to tin through a sulfide link; and the Y's represent chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyl tin chloride, tributyltin hydride, triphenyltin hydride, triallyltin chloride, and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis(carboethoxymethyl)-tin diiodide, dibutyltin dimethoxide, dibutyltin dibutoxide,

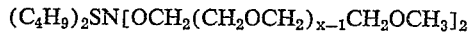

(in which $x$ is a positive integer), dibutyl-bis[O-acetylacetonyl]-tin, dibutyltin-bis(thiododecoxide), and

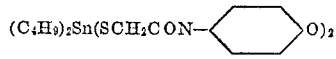

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, $[HOOC(CH_2)_5]_2SnO$, $$[CH_3OCH_2(CH_2OCH_2)_{x-1}CH_2]_2SnO$$

and $[CH_3OCH_2(CH_2OCH_2)_{x-1}CHO(CH_2)_5]_2SnO$ (in which the $x$'s are positive integers).

Methylstannonic acid, ethylstannonic acid, butylstannonic acid, octylstannonic acid, $HOOC(CH_2)_5$—$SnOOH$, $(CH_3)_3N(CH_2)_5SnOOH$,

and $CH_3OCH_2(OH_2OCH_2)_{x-1}CH_2O(CH_2)_5SnOOH$ are examples of group (e) catalysts and group (f) catalysts are represented by $HOOSn(CH_2)_xSnOOH$ and

the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17 M (a dibutyl tin compound believed to contain two sulfur-containing ester groups), Advastab T-50-LT (a dibutyl tin compound believed to contain two ester groups), are typical, as well as many other organo-tin compounds available under other trade names.

If desired, the above catalysts can be used to accelerate the reaction of the foamant polymer with isocyanate, particularly if the isocyanate-modified foamant is formed immediately before use to form a foam, or if the foaming operation is made continuous.

The rigidity or flexibility of the final foam product is influenced by the degree of branching in the molecular structure as well as by the molecular weight of the foamant polymer. Highly branched chain structures and shortened chain lengths from the center of the foamant molecule to the terminal hydroxyl group tend to trap carbon dioxide bubbles as rapidly as they are formed and to produce rigid foams of closed-cell structure whereas lengthened chain structures favor production of open-celled flexible foams.

In order to stabilize the composition during the foaming operation and to avoid breaking of the $CO_2$ bubbles in the early stages of the foaming, it is advantageous to employ a small percentage, e.g., about 0.001 to 10% by weight, based on the total ingredients, of a stabilizing or thickening agent such as methoxylated cellulose, available on the market as "Methocel," ethoxylated cellulose, available as "Ethocel," hydroxy ethylated cellulose, available as "Cellosize," benzyl cellulose, acetyl cellulose, acetylbutyryl cellulose, hydroxyl ethylated polyvinyl alcohol, polyvinyl chloride, vinyl chloride-vinyl acetate copolymers, polyvinyl acetate, polyvinyl butyral, polymeric methylmethacrylate, polymeric butylmethacrylate, high molecular weight polyethylene oxide, bentone, and metallic soaps of fatty acids such as aluminum stearate.

It is within the scope of the invention to add fillers such as clays, powdered aluminum, or diatomaceous earths in quantities up to 20% by weight, based on the weight of total ingredients. Dyes may also be added prior to the foaming step and are often desirable since polyurethane foams normally exhibit a slight tendency to yellow on aging.

It is also within the scope of the invention to employ small amounts, e.g., about 0.001 to 5%, by weight, based on the total ingredients, of an emulsifying agent such as a siloxane-oxyalkylene copolymer having from about 10 to 80 percent by weight of siloxane polymer and from 90 to 20 percent by weight of alkylene oxide polymer, such as the copolymers described in U.S. Patent 2,834,-748. Although the use of an emulsifier is desirable to influence the type of foam structure that is formed, the foam products of the invention can be prepared without emulsifiers.

The foam products of the invention can readily be prepared to have, in addition to the characteristics already referred to, densities advantageously within the range of about 1.0 to 30 lbs. per cubic foot. Within this range, densities of the order of 1.5 to 15 lbs. per cubic foot are generally preferred for rigid structural foams.

The utility and advantages of the product and methods of the invention will become more apparent from the following examples included to illustrate the best mode now contemplated for carrying out the invention.

In evaluating the compression properties of the foams produced in the various examples a foam cube of 2 x 2 x 2 inches was subjected to a compression load in an Instron tester and a deflection-load curve obtained. The compression of strength is given in lbs. per square inch (p.s.i.) either at the yield point or at 10 percent deflection.

*Example 1*

140 grams of a propylene oxide addition product of α-methyl-D-glucopyranoside having a hydroxyl no. of about 301.5 are mixed with 0.89 grams of dibutyltin dilaurate, 1.3 grams of a silicone oil surfactant (a siloxane-oxyalkylene copolymer) and 41 grams of trichloromonofluoromethane. 65.6 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 1.8 lbs./cu. ft. and a maximum compression of about 22 lbs./sq. in. at 4.8% deflection.

*Example 2*

140 grams of a propylene oxide addition product of α-methyl-D-glucopyranoside having a hydroxyl no. of about 301.5 are mixed with 0.89 gram of dibutyltin dilaurate, 1.3 grams of a silicone oil surfactant (a siloxane-oxyalkylene copolymer) and 41 grams of trichloromonofluoromethane. 69 grams of a mixture of 80%

2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 1.9 lbs./cu. ft. and a maximum compression of about 20 lbs./sq. in. at 7.2% deflection.

*Example 3*

100 grams of a propylene oxide addition product of α-ethyl-D-galactopyranoside having a hydroxyl no. of about 335 are mixed with 0.89 gram of dibutyltin dilaurate, 1.3 grams of a silicone oil surfactant (a siloxane-oxyalkylene copolymer) and 25 grams of trichloromonofluoromethane. 52 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 2 lbs./cu. ft.

*Example 4*

100 grams of an ethylene oxide addition product of α-methyl-D-glucopyranoside having a hydroxyl no. of about 412 are mixed with 0.89 gram of dibutyltin dilaurate, 1.3 grams of a silicone oil surfactant (a siloxane-oxyalkylene copolymer) and 25 grams of trichloromonofluoromethane. 65 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 2 lbs./cu. ft.

*Example 5*

100 grams of a propylene oxide adduct of α-methyl-D-xylopyranoside having a hydroxyl no. of about 330 are mixed with 0.89 gram of dibutyltin dilaurate, 1.3 grams of a silicone oil surfactant (a siloxane-oxyalkylene copolymer) and 25 grams of trichloromonofluoromethane. 52 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 2 lbs./cu. ft.

*Example 6*

100 grams of a propylene oxide-ethylene oxide addition product of α-methyl-D-glucopyranoside having a hydroxyl no. of about 374 are mixed with 0.89 gram of dibutyltin dilaurate, 1.3 grams of a silicone oil surfactant (a siloxane-oxyalkylene copolymer) and 25 grams of trichloromonofluoromethane. 58 grams of a mixture of 80% 2,4- and 20% 2,6-tolylene diisocyanates is added under intensive agitation. As soon as the foaming reaction begins the mixture is transferred into an open mold and allowed to cure for 10 minutes at 70° C. The foamed product has a density of about 2 lbs./cu. ft.

*Example 7*

100 grams of a propylene oxide addition product of α-methyl-D-glucopyranoside having a hydroxyl no. of about 37.5 is mixed with 0.5 gram of dibutyltin dilaurate, 0.1 gram of triethylamine, 0.8 gram of a silicone oil surfactant (a siloxane-oxyalkylene copolymer), and 2.6 grams of water. 32.5 grams of a mixture of 80% 2,4- and 20% 2,6-tolylene diisocyanates is added under intensive agitation. As soon as the foaming reaction begins the mixture is transferred into an open mold and allowed to cure for 10 minutes at 120° C. The foamed product has a density of approximately 2.2 lbs./cu. ft.

What is claimed is:

1. A cellular polyurethane foam prepared by the catalytic reaction of an organic polyisocyanate and polyether in the presence of a blowing agent wherein said ether corresponds to the formula:

$$[HO(R_4O)_n]_y\text{—}(R'')\text{—}OR$$

in which R is an alkyl radical of 1 to 8 carbon atoms; $R_4$ is a member selected from the group consisting of ethylene radicals, propylene radicals and mixtures thereof; R'' is the organic portion exclusive of reactive hydroxyl groups of a glycoside derived from a monosaccharide; y is an integer of 3 to 4; and n is a number having a value of at least one.

2. The composition of claim 1 wherein said ether has a molecular weight of at least about 450.

3. A cellular polyurethane foam prepared by the catalytic reaction of an organic polyisocyanate and polyether in the presence of a blowing agent wherein said ether corresponds to the formula:

$$[HO(R_4O)_n]_y\text{—}(R'')\text{—}OR$$

in which R is an alkyl radical of 1 to 8 carbon atoms; $R_4$ is a member selected from the group consisting of ethylene radicals, propylene radicals and mixtures thereof; y is an integer of 3 to 4; n is a number having a value of at least one; and R'' is the organic portion exclusive of reactive hydroxyl groups of a glycoside derived from a simple sugar selected from the group consisting of pentoses and hexoses.

4. The composition of claim 3 wherein R is a lower alkyl group.

5. The composition of claim 4 wherein the sugar is xylose.

6. The composition of claim 4 wherein the sugar is arabinose.

7. The composition of claim 4 wherein the sugar is galactose.

8. The composition of claim 4 wherein the sugar is glucose.

9. The composition of claim 4 wherein the sugar is fructose.

References Cited in the file of this patent

FOREIGN PATENTS 1,212,252    France ------------------ Oct. 19, 1959

OTHER REFERENCES

Wilson et al.: "Science," volume 128, No. 3335, page 1343, November 28, 1958.

UNITED STATES PATENT OFFICE
CERTIFICATE OF CORRECTION

Patent No. 3,073,788                                          January 15, 1963

Fritz Hostettler et al.

It is hereby certified that error appears in the above numbered patent requiring correction and that the said Letters Patent should read as corrected below.

Column 6, line 72, for "the R's" read -- the R"s --; column 7, line 20, the formula should appear as shown below instead of as in the patent:

line 40, the formula should appear as shown below instead of as in the patent:

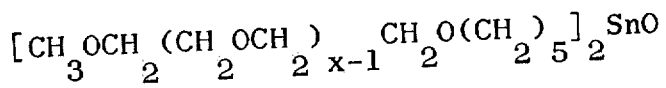

line 46, the formula should appear as shown below instead of as in the patent:

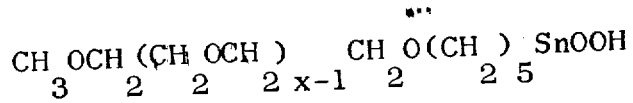

column 8, line 52, strike out "of"; column 9, line 28, strike out "agitation. As soon as the foaming reaction begins the" and insert the same after "intensive" in line 29, same column 9.

Signed and sealed this 3rd day of September 1963.

(SEAL)
Attest:

ERNEST W. SWIDER
Attesting Officer

DAVID L. LADD
Commissioner of
Patents